June 9, 1931.  E. BORNAND ET AL  1,809,468

ELECTRIC METAL WORKING

Filed Nov. 29, 1929

Patented June 9, 1931

1,809,468

UNITED STATES PATENT OFFICE

EMILIEN BORNAND AND HANS ARNOLD SCHLAEPFER, OF GENEVA, SWITZERLAND

ELECTRIC METAL WELDING

Application filed November 29, 1929, Serial No. 410,583, and in France February 19, 1929.

The present invention relates to electric metal welding and more particularly to a welding appliance in which the heat required for the fusion of the two parts to be welded is supplied by means of high-frequency currents flowing near the seam to be welded and inducing Foucault currents in the metal of the two parts.

The object of the invention is the provision of an appliance of extreme simplicity and easy handling.

Figure 1:
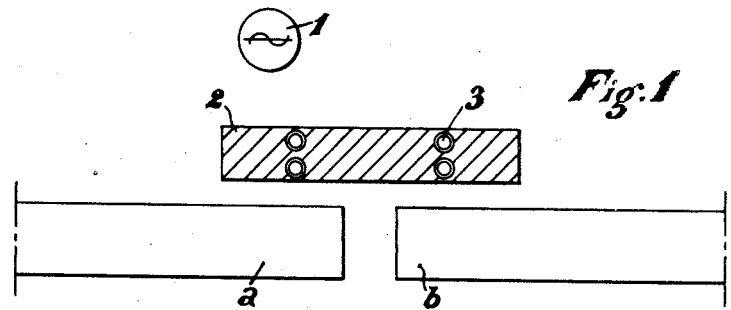
Figure 1 is an elevation of the welding appliance showing the support for the electric conductor in section.
Figure 2:
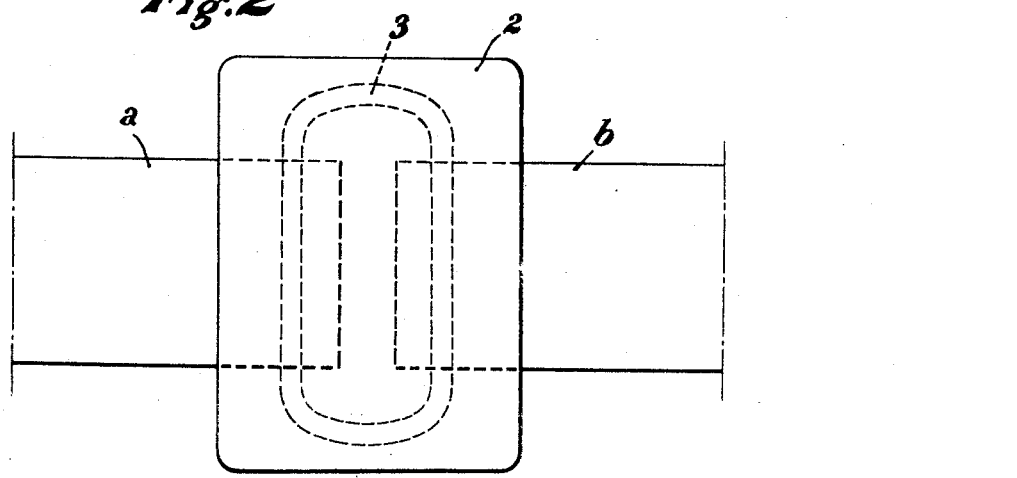
Figure 2 is a plan view of the appliance.

$a$ and $b$ are two metal parts supposed to be welded together. 1 is a source of electric high-frequency currents and 2 indicates a support of electrically insulating and refractory material which encloses a conductor 3 through which high-frequency currents can flow. In order to weld the parts $a$ and $b$ together they will be brought near each other and then the support 2 is laid over the parts as shown in Figure 2. When a high-frequency current is sent through the conductor 3, Foucault currents will be induced in the parts $a$ and $b$ which currents bring these parts to a temperature which is sufficient for the fusion of the two adjacent surfaces.

Figure 3:
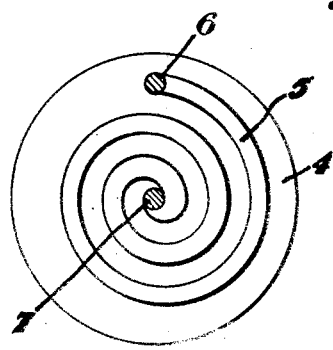
Figure 3 is a modified form of conductor and support therefor.

In the modification according to Figure 3 the refractory support 4 has the shape of a circular disc and the conductor 5 is disposed in spiral form on one face of the disc. The spiral 5 is connected in 6 and 7 to the source of high-frequency current.

The advantage of the described welding appliance lies mainly in the extreme simplicity of construction and handling and the conductor 3 can be made to conform to the shape of the seam to be welded.

It is to be understood that the invention is not limited to what is shown on the drawings; particularly there could be provided two supports carrying conductors, one above each of the two parts to be welded, or the parts could be placed above the support so that the progress of welding can be watched.

It is also possible to enclose the two parts, except the surfaces to be welded, in a layer of refractory material so that the metal is protected against oxidation, as the induction of Foucault currents will take place across this refractory layer.

We claim:

1. A welding appliance comprising an electrically insulating and refractory support placed in proximity of the seam to be welded, a coil embedded in said support, and a source of high frequency currents for feeding said coil to thereby induce Foucault currents in the parts to be welded.

2. A welding appliance, comprising a source of high-frequency currents, an electrically insulating and refractory support, and a conductor disposed in the shape of a spiral on said support and adapted to be traversed by high frequency current, said support being adapted to be placed in proximity of the parts to be welded, permitting the high frequency current to generate Foucault currents in the said parts.

In testimony whereof we affix our signatures.

EMILIEN BORNAND.
HANS ARNOLD SCHLAEPFER.